(12) United States Patent
Kolesnikov et al.

(10) Patent No.: US 11,366,081 B2
(45) Date of Patent: Jun. 21, 2022

(54) METHOD AND ASSEMBLY FOR DETERMINING THE TYPE OF A FLUID USING ULTRASOUND

(71) Applicant: Wema System AS, Blomsterdalen (NO)

(72) Inventors: Viktor Kolesnikov, Bergen (NO); Hakon Boe, Bergen (NO)

(73) Assignee: TE CONNECTIVITY NORGE AS, Blomsterdalen (NO)

( * ) Notice: Subject to any disclaimer, the term of this patent is extended or adjusted under 35 U.S.C. 154(b) by 826 days.

(21) Appl. No.: 16/153,089

(22) Filed: Oct. 5, 2018

(65) Prior Publication Data

US 2019/0107513 A1   Apr. 11, 2019

(30) Foreign Application Priority Data

Oct. 6, 2017  (EP) .................................. 17195214

(51) Int. Cl.
| | |
|---|---|
| *G01N 29/07* | (2006.01) |
| *G01N 29/032* | (2006.01) |
| *G01N 29/44* | (2006.01) |
| *G01N 29/34* | (2006.01) |
| *G01N 29/024* | (2006.01) |

(52) U.S. Cl.
CPC ......... *G01N 29/032* (2013.01); *G01N 29/024* (2013.01); *G01N 29/343* (2013.01); *G01N 29/348* (2013.01); *G01N 29/4427* (2013.01); *G01N 2291/011* (2013.01); *G01N 2291/015* (2013.01); *G01N 2291/0228* (2013.01); *G01N 2291/044* (2013.01); *G01N 2291/051* (2013.01); *G01N 2291/101* (2013.01)

(58) Field of Classification Search
CPC ............. G01N 29/032; G01N 29/4427; G01N 29/024; G01N 29/02
See application file for complete search history.

(56) References Cited

U.S. PATENT DOCUMENTS

| | | | | |
|---|---|---|---|---|
| 3,791,200 A | * | 2/1974 | Hayre | G01N 29/024 73/589 |
| 5,060,507 A | * | 10/1991 | Urmson | G01N 29/024 73/24.01 |
| 5,076,094 A | | 12/1991 | Frye et al. | |
| 5,255,564 A | * | 10/1993 | Glad | G01N 29/024 73/597 |

(Continued)

FOREIGN PATENT DOCUMENTS

GB         1583746 A       2/1981

OTHER PUBLICATIONS

European search report, dated Mar. 21, 2018, 9 pages.

*Primary Examiner* — Lisa M Caputo
*Assistant Examiner* — Alex T Devito

(57) ABSTRACT

An assembly for determining a type of a fluid, the assembly configured to be mounted to a tank containing the fluid, comprises an ultrasound sending/receiving subassembly and a processor module. The ultrasound sending/receiving subassembly is configured to send a plurality of ultrasound signals into the fluid and receive the ultrasound signals reflected from the fluid. An ultrasound signal of the plurality of ultrasound signals has at least a first frequency and a second frequency different from the first frequency. The processor module is adapted to determine an attenuation of the ultrasound signal at the first frequency and at the second frequency.

14 Claims, 5 Drawing Sheets

(56) References Cited

U.S. PATENT DOCUMENTS

| | | | |
|---|---|---|---|
| 5,359,897 A | * | 11/1994 | Hamstead ............ G01N 29/024 73/32 A |
| 5,473,934 A | | 12/1995 | Cobb |
| 5,767,407 A | | 6/1998 | Sinha |
| 7,246,522 B1 | | 7/2007 | Diaz et al. |
| 8,820,147 B2 | | 9/2014 | Sinha |

* cited by examiner

METHOD AND ASSEMBLY FOR DETERMINING THE TYPE OF A FLUID USING ULTRASOUND

CROSS-REFERENCE TO RELATED APPLICATION

This application claims the benefit of the filing date under 35 U.S.C. § 119(a)-(d) of European Patent Application No. 17195214.6, filed on Oct. 6, 2017.

FIELD OF THE INVENTION

The present invention relates to a method and an assembly for determining a type of a fluid and, more particularly, to a method and assembly for determining a type of a fluid using ultrasound.

BACKGROUND

An unambiguous determination of a type of fluid in a tank, for example the type of a fluid to reduce or eliminate pollutants in exhaust gases from combustion engines, such as urea, a water-based urea solution, or a similar reagent fluid, is not always easy. At least at some temperatures, more than one type of fluid may exhibit the same or very similar characteristics. If this is the case, these types of fluids cannot be discerned from one another.

SUMMARY

An assembly for determining a type of a fluid, the assembly configured to be mounted to a tank containing the fluid, comprises an ultrasound sending/receiving subassembly and a processor module. The ultrasound sending/receiving subassembly is configured to send a plurality of ultrasound signals into the fluid and receive the ultrasound signals reflected from the fluid. An ultrasound signal of the plurality of ultrasound signals has at least a first frequency and a second frequency different from the first frequency. The processor module is adapted to determine an attenuation of the ultrasound signal at the first frequency and at the second frequency.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
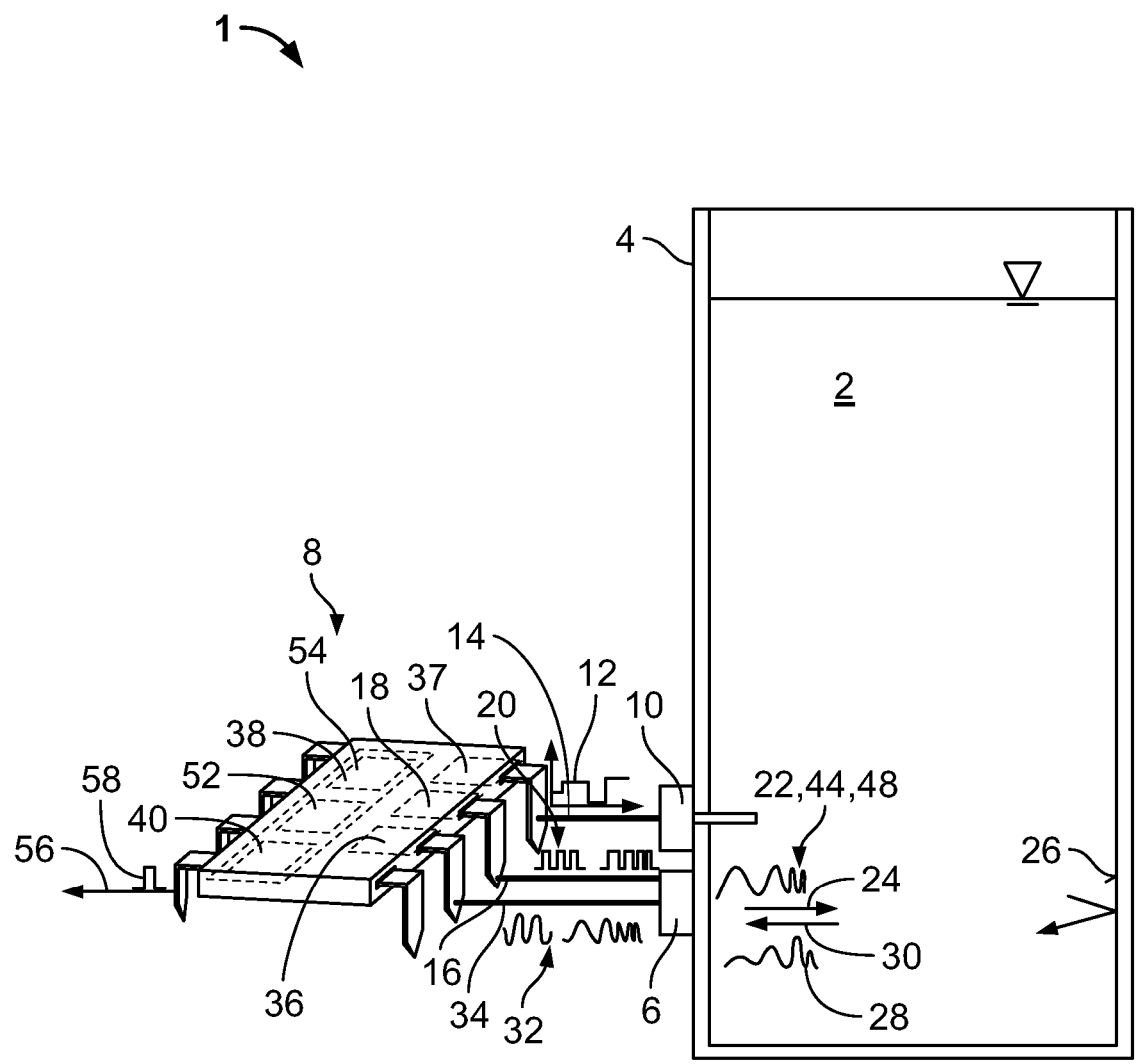
FIG. 1 is a schematic representation of an assembly for detecting the type of a fluid using ultrasound according to an embodiment.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

An assembly 1 for determining the type of a fluid 2 in a tank 4 is shown in FIG. 1. In various embodiments, the tank 4 may, but does not necessarily, form part of the assembly 1. In an embodiment, the fluid 2 is a reagent fluid which is used in the automobile sector. In an embodiment, the tank 4 may be a tank for a water-based urea solution or another fluid 2 for cleaning exhaust gases of an combustion engine.

The assembly 1 comprises an ultrasound sending/receiving subassembly 6, as shown in FIG. 1. The subassembly 6 may comprise a separate ultrasound emitter (not shown) and a separate ultrasound microphone (not shown), or both the sending and receiving function may be unitarily combined in a single ultrasound transducer head as in the shown embodiment.

The assembly 1 comprises a controller 8, which may be an algorithm stored on a non-transitory computer readable medium and executable by a processor, or may be an electronic component on which various functions are hard-wired and/or programmed. For example, the controller 8 may be an Application-Specific Integrated Circuit ("ASIC"). The assembly 1 comprises a temperature sensor 10 for measuring a temperature of the fluid 2 and sending a temperature signal 12, which is representative of the temperature of the fluid 2, to the controller 8 via a wired, wireless or virtual temperature data line 14.

The ultrasound sending/receiving subassembly 6 is connected via a wired, wireless or virtual output line to a function generator module 18 for generating output signals 20. A virtual line may, for example, be generated using data in a stream, which data are addressed uniquely to a device. The output signals 20 are sent via the output line 16 to the ultrasound sending/receiving subassembly 6, where they are converted into ultrasound signals 22 that are directed into the fluid as indicated by arrow 24, which indicates a propagation direction. The ultrasound signals 22 are reflected, for example, by a surface 26 of the tank 4, which surface 26 may be located opposite the ultrasound sending/receiving subassembly 6 in the propagation direction 24 of the ultrasound signals 22.

The ultrasound sending/receiving subassembly 6 records the incoming reflected ultrasound signal 28 resulting from the sent ultrasound signal 22, as indicated by arrow 30 in FIG. 1. Not only the first reflection off the surface 26 may be recorded but any number of subsequent reflections. The incoming reflected ultrasound signals 28 are converted into input signals 32 by the ultrasound sending/receiving subassembly 6. The input signals 32 are transmitted by a wired, wireless and/or virtual input line 34 to a processor module 36.

The processor module 36 of the controller 8 is configured to compute a speed of sound from the ultrasound signals 22, 28, for example, by a simple runtime analysis. The processor module 36 is further configured to compute an attenuation of the ultrasound signals 22, 28 at least one, and in an embodiment at at least two frequencies of the ultrasound signals 22. Both the speed of sound computed by the processor module 36 and the frequency-dependent attenuation of the second ultrasound signal 22 as it propagates through the fluid also computed by the processor module 36 allow identifying the type of fluid 2 unambiguously.

Figure 4:
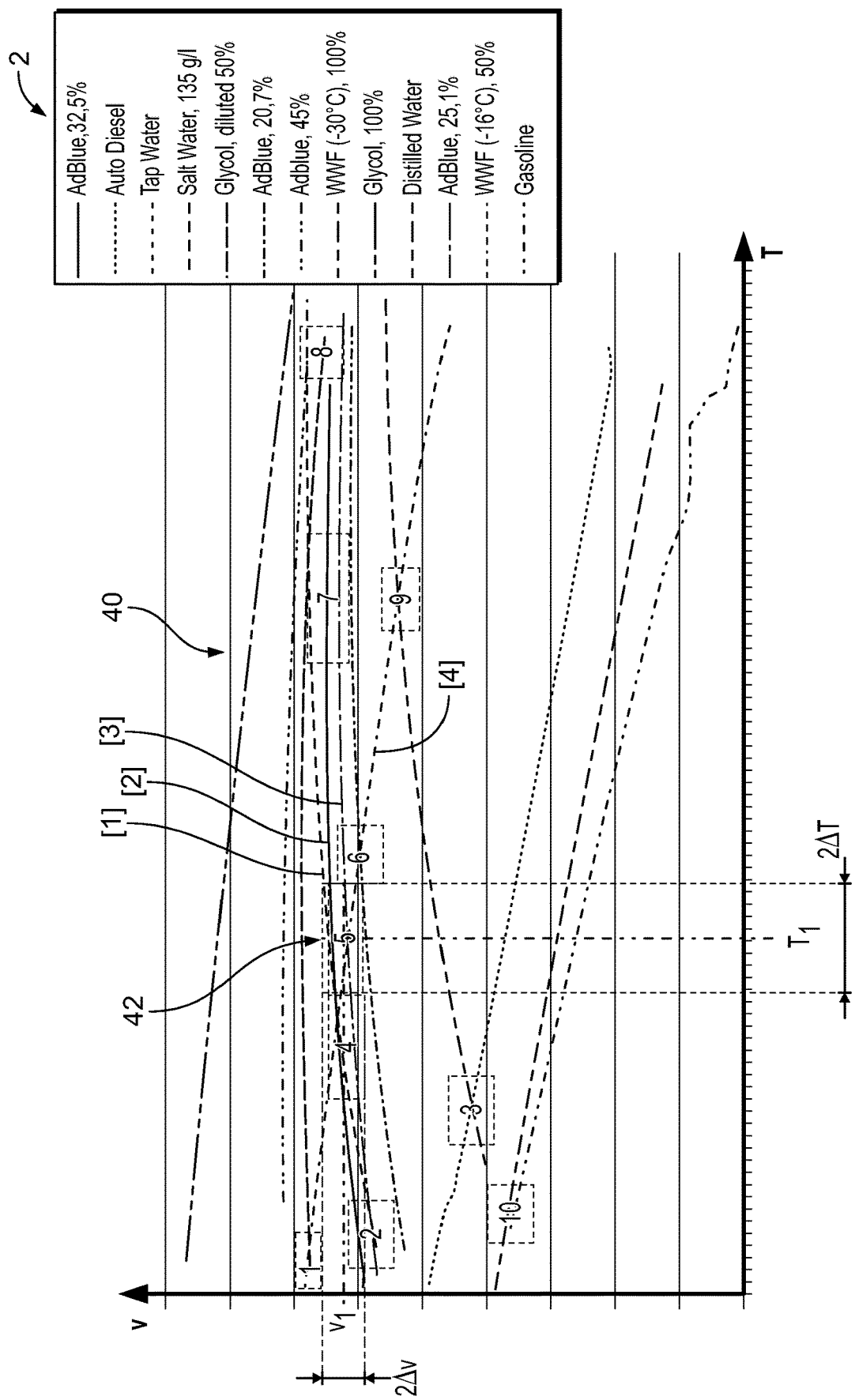
FIG. 4 is a graph of the speed of sound in different types of fluids over temperature.

For the identification, the controller 8 comprises a memory 38, which is a non-transitory computer readable medium in which various data are stored. For example, a continuous or scattered first section 40 of the memory 38 may contain data which are representative of the speed of sound v at various temperatures T for different fluid types 2. An example of such data is shown in FIG. 4, where the speed of sound over temperature is shown for different water-based AdBlue fluids, diesel, tap water, salt water, various concentrations of glycol in water and various concentrations of window washing fluid (WWF). The data may be stored as at least one of discrete data points which may be used for inter- or extrapolation, as a look-up table, and as an analytical, for example, approximative, function. In an embodiment, the data is based on experiments. The memory 38 may also contain data on dimensions of the tank 4, such as a diameter of the tank 4.

In FIG. 4, dashed and numerated boxes are shown, where the speed of sound of different types of fluids 2 differs only slightly at a given temperature. Thus, a speed of sound v as measured by the ultrasound sending/receiving subassembly 6 and/or the determination algorithm carried out by the processor module 36 may not be accurate enough to unambiguously define which type of fluid 2 is in the tank 4 (FIG. 1) by using the measured speed of sound.

In the following, it is explained how to resolve this ambiguity with the assembly 1. By way of example only, this is explained with reference to the dashed box containing the numeral 5 in FIG. 4. In box 5, a speed of sound $v_1$ has been measured by the assembly 1. To compensate for measurement errors, a predetermined amount of variation □ is defined in the assembly 1, in particular in the processing module 36. The variation may be defined by a user or automatically. Thus, all fluids 2 which have a stored speed of sound of $v_1$–□v and $v_1$+□v are considered. The representation of these fluids 2 in the memory section 40 constitutes a candidate set 42 of types of fluids 2. To also account for errors and inaccuracies when measuring the temperature of the fluid 2 using the temperature sensor 10, a similar interval □T may be used around the measured temperature $T_1$.

In such an instance, the candidate set 42 contains all those fluids 2 which at a temperature of between $T_1$–□$T_2$ and $T_1$+□$T_2$ have a speed of sound of between $v_1$–□v and $v_1$+□v. In the example, the fluids 2 within the candidate set 42 are symbolically represented as [1], [2], [3], [4] and may represent, for example, a 50% solution of window washing fluid with a minimum application temperature of –16° C., a 25.1% water-based solution of AdBlue, a 32.5% water-based solution of AdBlue and salt water of a density of 125 g/l. The type of fluid 2 may be represented within the assembly 1 as a numerical value. A type of fluid 2 in the candidate set 42 or in general in the assembly may be represented by data, such as a certain numerical value in any given number format, such as binary, decimal, ascii, or hexadecimal.

In order to resolve this ambiguity, the assembly 1 is switched from a first operational mode, in which the speed of sound v is determined using a first ultrasound signal 44 to a second operational mode, in which a second ultrasound signal 48 is generated by the function generator module 18 and the ultrasound sending/receiving subassembly 6. If there is only one type of fluid 2 in the candidate set 42, it may be not necessary to generate a second ultrasound signal 48, as there is no unambiguity. Thus, in an embodiment, the second ultrasound signal 48 is only generated if there are more than two different types of fluids 2 in the candidate set 42.

To perform this switch, the controller 8 has a switching module 37. The second ultrasound signal 48 differs from the first ultrasound signal 44 in that it contains more than one frequency. Whereas the first ultrasound signal 44 is used to determine the speed of sound and thus to determine the candidate set 42 of fluid types 2, the second ultrasound signal 48 is used to determine the attenuation or, equivalently, the absorption or attenuation of ultrasound at at least one frequency of the second ultrasound signal 48. This second measurement is then used to unambiguously define a single type of fluid 2 within the candidate set 42.

The identification of the fluid by the attenuation at at least two different frequencies is based on the following equation:

$$X = \alpha \times l \times f,$$

where X is the attenuation, l is the length of the path the ultrasound travels through the fluid from the sender to the receiver within the ultrasound sending/receiving subassembly 6, f is the frequency of the ultrasound signal, and $\alpha$ is the fluid-dependent attenuation per unit length and frequency, e.g. in [dB MHz$^{-1}$ cm$^{-1}$], i.e. a material-dependent quantity. As the dimensions of the tank 4, such as a diameter, are known, l is known for the first and any further reflection of the ultrasound signal. The frequency f is also known and the attenuation X is measured. This allows to identify $\alpha$, and by mapping a and f and comparing it to fit or stored data, the fluid 2 can be identified as described in greater detail below. Of course additional parameters can also be measured which can be used to identify the fluid 2, such as dispersion and/or speed of sound at different ultrasound frequencies.

The amplitude and/or frequency content of the first and/or second signal 44, 48 may be generated depending on the fluid temperature as measured by the temperature sensor 10. The number of frequencies contained in the second ultrasound signal 48, and in particular the number of frequencies which are used to determine the attenuation, may depend on the number of fluid types in the candidate set 42. For example, the number of different frequencies contained in the second ultrasound signal 48 may be at least the number of fluid types in the candidate set 42.

Figure 2A:
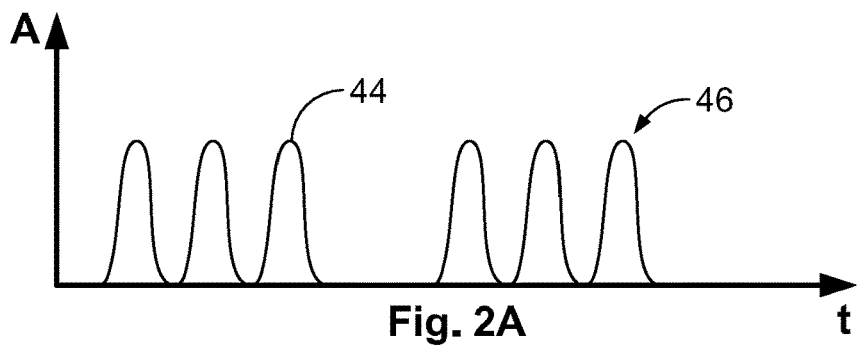
FIG. 2A is a graph of a first ultrasound signal.

An example of a first ultrasound signal 44 is shown in FIG. 2A, in which the amplitude A of the ultrasound signal 22 over time t is depicted. As can be seen, the first ultrasound signal 44 comprises at least one pulse 46 containing an ultrasound wave of a single frequency.

Figure 2B:
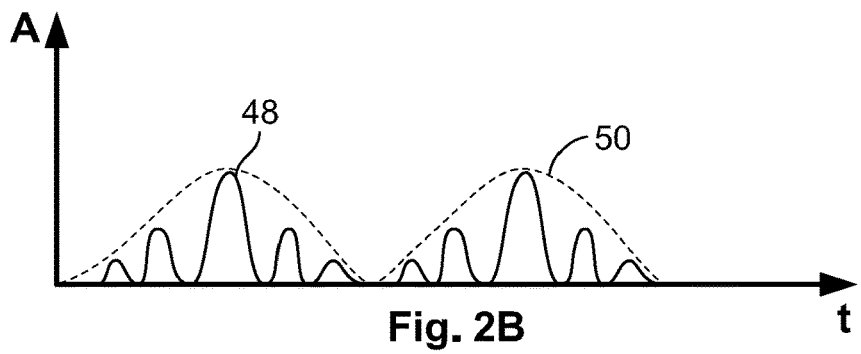
FIG. 2B is a graph of an embodiment of a second ultrasound signal.
Figure 2C:
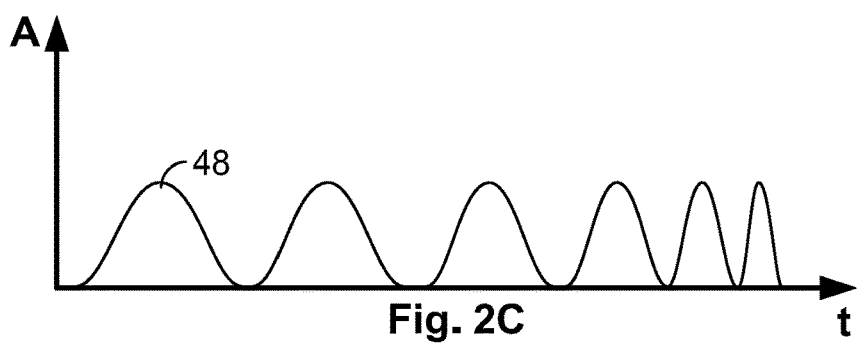
FIG. 2C is a graph of another embodiment of a second ultrasound signal.
Figure 2D:
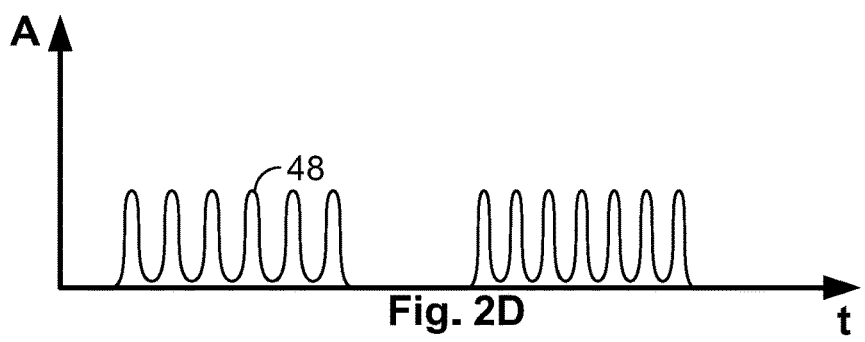
FIG. 2D is a graph of another embodiment of a second ultrasound signal.

Examples of a second ultrasound signal 48 are shown in FIGS. 2B-2D. The second signal 48 contains more than one frequency. The different frequencies may result from a variation of the frequency of the ultrasound signal 22 itself or by modifying the amplitude of the second ultrasound signal 48 over time, so that an envelope 50 shown in FIG. 2B represents a different frequency. Of course, the frequencies contained in the second ultrasound signal 48 should be within the frequency range that can be detected by the ultrasound sending/receiving subassembly 6.

Figure 2E:
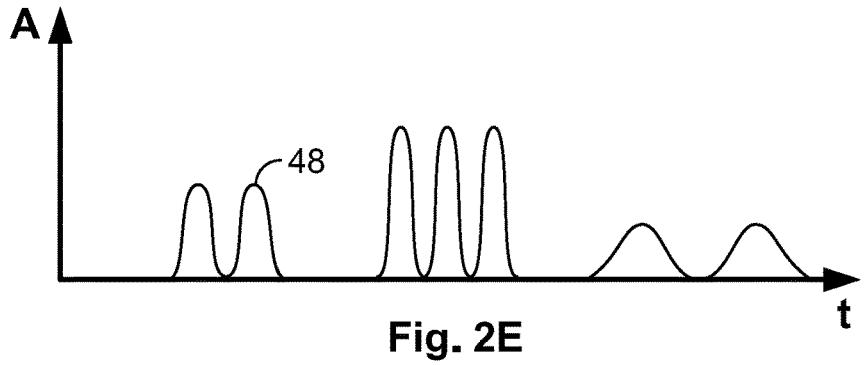
FIG. 2E is a graph of another embodiment of a second ultrasound signal.

The second ultrasound signal 48 may be a continuous signal or a discontinuous signal comprising several pulses. An example of a continuous signal is a continuous ultrasound wave of which the frequency may change discontinuously or continuously, for example, a chirp signal. Of course, the pulses themselves may also be chirp signals. FIG. 2C shows an example of a chirp signal with increasing frequency. The frequency may also decrease over time. The second ultrasound signal 48 may also comprise pulses which have different frequency as shown in FIG. 2D and/or amplitudes and/or duty cycles as shown in FIG. 2E. Any combination of the above described second ultrasound signals 28 may be used.

Figure 3:
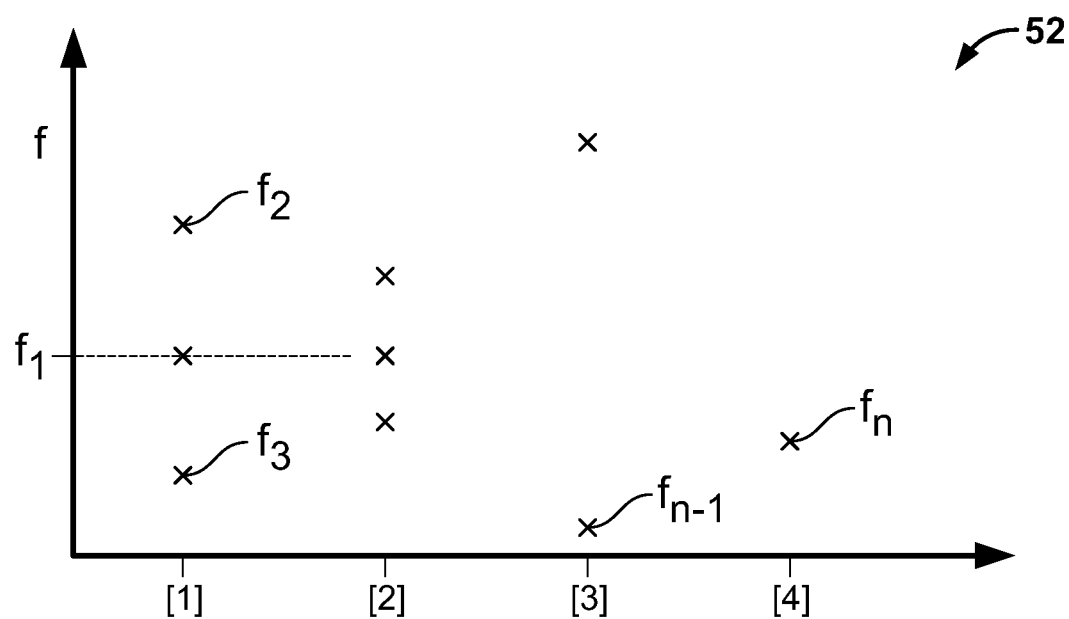
FIG. 3 is a graph of data for determining frequencies in the second ultrasound signal.

The second ultrasound signal 48 may be formed depending on the candidate set 42. For example, the frequency, amplitude, the duration of one or more pulses, the duty cycle of one and more pulses, and/or the frequency contained in each of the pulses may be determined depending on the number and/or type of fluids 2 in the candidate set 42. For this, the assembly 1, in particular the controller 8 comprises a memory section 52 shown in FIG. 1. The memory section 52 contains for each type of fluid 2, which is also contained in the memory section 40, data which are representative for frequencies f, at which ultrasound absorption or attenuation may reach a maximum. An example of such data is shown in FIG. 3 for the fluids [1] to [4] of the candidate set 42. Only those frequencies of the data stored in memory section 52 are used for generating the second ultrasound signal 48 that do not overlap. For example, frequency f1 will not be used, as this frequency will not allow distinguishing between fluids [1] and [2]. The remaining frequencies will then be used to compose the second ultrasound signal 48. Of course, instead of just defining the frequency, memory section 52 may also store other parameters, such as the complete signal shape or analytical function signal for each fluid 2 which have been shown to most clearly identify a given type of fluid 2. In such a case, the second ultrasound signal 48 is composed by simply reading the signal data from memory section 52. Both the memory section 40 and the memory section 52 are non-transitory computer readable mediums.

Figure 5:
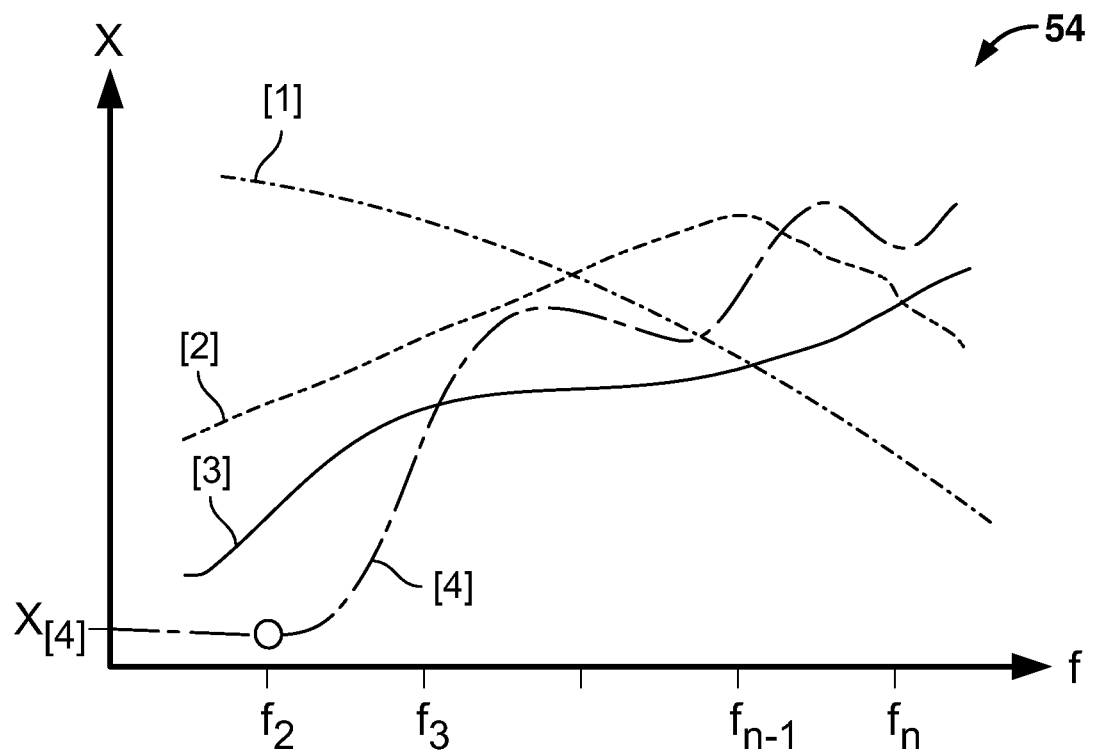
FIG. 5 is a graph of an attenuation value at a certain frequency for different fluid types.

For determining the type of fluid 2 in the tank 4, the attenuation X at the frequencies f2 to fn contained within the second ultrasound signal 48 is measured and compared with data stored in another memory section 54 as shown in FIGS. 1 and 5. The another memory section 54 is a non-transitory computer readable medium. In these data, the attenuation X at different frequencies is stored. If, for example, an attenuation $X_{[4]}$ is measured at a frequency f2 as shown in FIG. 5, the fluid types [1], [2] and [3] from candidate set 42 are discarded. The result output 56 of controller 8 contains result data 58 that are representative of the fluid type [4]. This means that the method and assembly have identified the fluid 2 in the tank 4 to correspond to fluid [4] of the candidate set.

As shown in FIG. 5, the absorption or attenuation X at frequency f2 of the other fluids in the candidate set 42 is sufficiently different from the fluid type [4] to avoid an erroneous identification of a fluid 2 due to measurement errors. This is because the frequencies in the second ultrasound signal 48 have been determined using the data in memory section 52 to result in unambiguous measurement.

Use of the first ultrasound signal 44 is not mandatory. In another embodiment, the above assembly and method can, in a simple modification, use only the second ultrasound signal 48 to identify the fluid 2. In this case, a first ultrasound signal 44 is not present and the speed of sound v is not used to identify the fluid 2 and/or the candidate set 42. Instead, only the attenuation X at at least two frequencies is used for identification of the fluid 2.

What is claimed is:

1. A method for determining a type of a fluid, comprising:
    sending a first ultrasound signal into the fluid;
    determining a speed of sound of the fluid automatically from the first ultrasound signal;
    determining a candidate set of fluid types from the speed of sound of the first ultrasound signal, the candidate set of fluid types containing at least one fluid type of which a stored speed of sound differs from the speed of sound determined from the first ultrasound signal by less than a predetermined amount;
    sending a second ultrasound signal into the fluid after the first ultrasound signal, the second ultrasound signal having at least a first frequency and a second frequency different from the first frequency, the form of the second ultrasound signal depends on the at least one type of fluid in the candidate set;
    determining an attenuation of the second ultrasound signal automatically at the first frequency and at the second frequency; and
    determining the type of the fluid from the attenuation at the first frequency and at the second frequency, the attenuation determined from the second ultrasound signal is compared to a stored attenuation value of the at least one fluid type in the candidate set.

2. The method of claim 1, wherein the fluid is a reagent fluid used in the automotive sector.

3. The method of claim 1, wherein at least one of a frequency, an amplitude, a number of pulses, a duration of at least one pulse, and a duty cycle of pulses of the second ultrasound signal depend on the at least one type of fluid in the candidate set.

4. The method of claim 1, wherein the first ultrasound signal differs from the second ultrasound signal.

5. The method of claim 1, wherein a frequency of the second ultrasound signal varies between the first frequency and the second frequency over time.

6. The method of claim 5, wherein the second ultrasound signal contains a series of pulses.

7. An assembly for determining a type of a fluid, the assembly configured to be mounted to a tank containing the fluid, comprising:
    an ultrasound sending/receiving subassembly configured to send a plurality of ultrasound signals into the fluid and receive the ultrasound signals reflected from the fluid, the ultrasound sending/receiving subassembly sends and receives a first ultrasound signal into the fluid before a second ultrasound signal, the second ultrasound signal has at least a first frequency and a second frequency different from the first frequency; and
    a processor module adapted to determine a speed of sound of the fluid from the first ultrasound signal and determine a candidate set of fluid types from the speed of sound of the first ultrasound signal, the candidate set of fluid types containing at least one fluid type of which a stored speed of sound differs from the speed of sound determined from the first ultrasound signal by less than a predetermined amount, the form of the second ultrasound signal depends on the at least one type of fluid in the candidate set, the processor module adapted to determine an attenuation of the second ultrasound signal at the first frequency and at the second frequency and compare the attenuation to a stored attenuation value of the at least one fluid type in the candidate set.

8. The assembly of claim 7, wherein the fluid is a reagent fluid used in the automotive sector.

9. The assembly of claim 7, further comprising a switching module adapted to switch the assembly from a first operational mode in which the first ultrasound signal is sent and received into a second operational mode in which the second ultrasound signal is sent and received depending on the speed of sound determined by the processor module.

10. The assembly of claim 9, further comprising a temperature sensor adapted to determine a temperature of the fluid, the switching module switches from the first operational mode into the second operational mode depending on the temperature of the fluid.

11. The assembly of claim 10, wherein the second ultrasound signal is formed depending on at least one of the speed of sound and the temperature of the fluid.

12. The assembly of claim 7, further comprising a memory section storing at least one of the attenuation, at least one frequency, and the speed of sound for a plurality of different types of fluids.

13. The assembly of claim 7, further comprising a memory section storing at least one of the frequency, a shape, a pulse duration, a pulse duty cycle, and a pulse frequency for a plurality of different types of fluids.

14. A method for determining a type of a fluid, comprising:
   sending a first ultrasound signal into the fluid;
   determining a speed of sound of the fluid automatically from the first ultrasound signal; and
   determining a candidate set of fluid types from the speed of sound of the first ultrasound signal, the candidate set of fluid types containing at least one fluid type of which a stored speed of sound differs from the speed of sound determined from the first ultrasound signal by less than a predetermined amount;
   wherein, only if there are more than two types of fluids in the candidate set, performing the steps of:
      sending a second ultrasound signal into the fluid after the first ultrasound signal, the second ultrasound signal having at least a first frequency and a second frequency different from the first frequency, the form of the second ultrasound signal depends on the at least one type of fluid in the candidate set;
      determining an attenuation of the second ultrasound signal automatically at the first frequency and at the second frequency; and
      determining the type of the fluid from the attenuation at the first frequency and at the second frequency.

\* \* \* \* \*